June 29, 1926.
J. D. SARTAKOFF
LIQUID FEEDING APPARATUS
Filed March 9, 1923
1,590,321
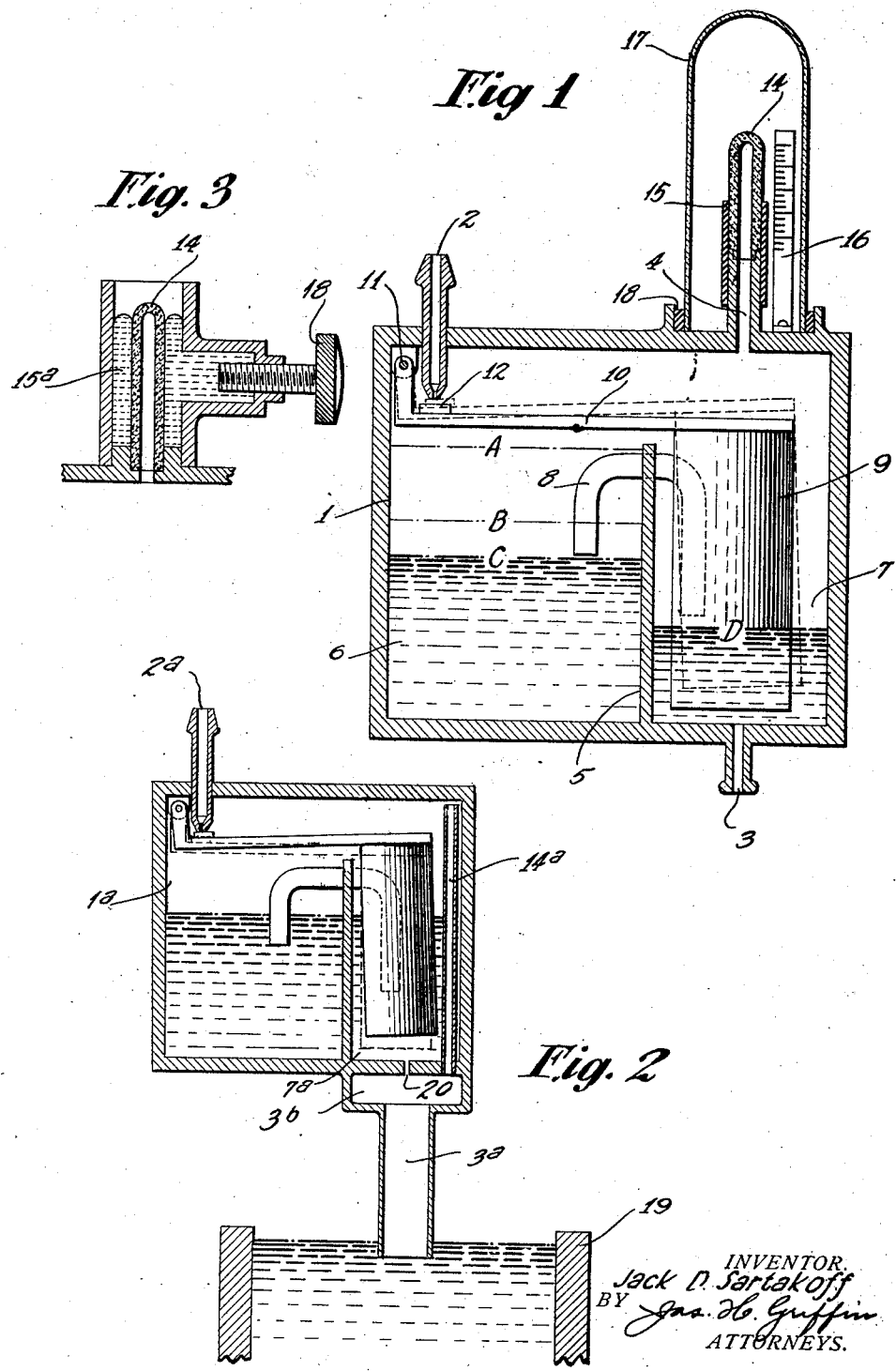
INVENTOR.
Jack D. Sartakoff
BY
ATTORNEYS.

Patented June 29, 1926.

1,590,321

UNITED STATES PATENT OFFICE.

JACK D. SARTAKOFF, OF FOREST HILLS, NEW YORK.

LIQUID-FEEDING APPARATUS.

Application filed March 9, 1923. Serial No. 624,056.

This invention is an apparatus for regulating the flow of a liquid in such manner as to accurately control the quantities of such liquid fed through predetermined periods. In other words, it comprises an apparatus wherein the flow of liquid in measured quantities can be accurately controlled or regulated.

It has long been desirable to obtain apparatus for accomplishing this result both for laboratory and commercial uses, but up to the present time, I know of no apparatus other than the present invention whereby the flow of liquid can be accurately determined. Apparatus for accomplishing this result has been proposed, but such apparatus has failed in the purpose for which it was intended due mainly to the fact that in the varying of hydrostatic pressures the apparatus correspondingly varied in a manner which could not be definitely or automatically controlled. The present invention obviates these difficulties and provides simple and thoroughly efficient means for accurately feeding a liquid in predetermined quantities during predetermined times.

While the apparatus of this invention may vary within wide limits, it embodies in one of its practical and commercial forms a chamber embodying a liquid inlet and a liquid outlet, the interior of the chamber being divided so that the liquid entering the chamber is received into one compartment and is adapted to be siphoned into a second compartment in which a float operates. The float controls the valve associated with the inlet, and the sophon is so disposed that a predetermined amount of liquid will be fed into the first compartment before the siphon starts to operate and to feed liquid into the second compartment. Liquid will flow into the first compartment and thence into the second compartment through the siphon until a predetermined amount of liquid has been fed into the second compartment, whereupon the float will come into operation to automatically seal the inlet. Irrespective of the hydrostatic pressure at the inlet, the feed of a predetermined fixed volume of liquid will automatically effect the sealing of this inlet and this amount of liquid will be constant.

The present invention automatically controls the feeding of this constant amount through the outlet and to this end, the chamber is closed and sealed, but is provided with a vent opening through which air may enter a chamber in regulable quantities. After the inlet has been sealed by the float controlled valve, it is manifest that the liquid cannot flow from said chamber until air can flow into said chamber and by regulating the amount of air flowing into the chamber, the exit of the liquid can be accurately controlled. In the preferred embodiment of the invention, I associate with the vent opening a porous material through which the air may slowly filter and enter the chamber and associate with this porous material means for controlling the exposed surface thereof, so as to control the amount of air which can filter into the chamber. By thus controlling the amount of air entering the chamber during a certain period, I can thus accurately control a corresponding amount of liquid which can exit from said chamber during a like period, and in this manner I can accurately adjust and control the feed of the fluid through the outlet.

Aside from the forgoing features of the invention, the apparatus embodies many additional features of invention some of which may be employed independently of the timed feed member and in fact certain features of the invention render the invention susceptible to satisfactory operation in conjunction with apparatus wherein it is desired to control the feed of fluid by the liquid level in a reservoir to which the fluid is to be fed and irrespective of the time element. The present invention accordingly is adapted for general and varied uses as will be apparent from the following detailed description when read in conjunction with the accompanying drawings and appended claims.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 is a central section of an apparatus embodying the present invention.

Figure 2 is a modified form of apparatus also embodying the present invention; and, Figure 3 illustrates a detail modified construction which may be used in lieu of certain detail of construction shown in Figure 1.

Referring to the drawings and more particularly to the structure shown in Figure 1, 1 designates a closed chamber provided with a liquid inlet 2, a liquid outlet 3 and an air inlet 4. The interior of the chamber 1 is divided by a partition 5 into two compartments 6 and 7, the former of which is below the inlet 2 while the latter of which communicates with the outlet 3. A siphon 8 is mounted in the partition 5 and near the top thereof with the short arm of the siphon extending into the compartment 6 and its longer arm extending into the compartment 7.

In the compartment 7 is positioned a float 9 secured to an arm 10 pivoted at 11 and carrying a suitable valve 12 for controlling the fluid inlet 2. This valve may be of any suitable form, but for the purpose of illustration I have shown it as embodying a rubber diaphragm which, when the float is elevated is caused to bear against the delivery end of the fluid inlet for the purpose of sealing the same. In practice a needle valve or any other type of valve may be employed, so long as it is adapted to be closed when the float is elevated.

When the float is depressed liquid from a suitable source is adapted to flow through the inlet 2 into the compartment 6 and in its continued flow will fill the compartment 6 substantially to the level A, which level is above the top of the siphon 8. As soon as the liquid has reached this level in the compartment 6, it will flood the siphon and cause the same to operate as a siphon with the result that liquid will be delivered through this siphon from the compartment 6 into the compartment 7. As the liquid is delivered into the compartment 7, it will start to flow out through the outlet 3, but in practice this outlet is made sufficiently small, so that the liquid will be delivered faster through the siphon than it will flow out through the outlet 3 and accordingly the liquid level will rise in the compartment 7 until it reaches substantially the level D, whereupon the float will be elevated and will seal the inlet 2 against a further inflow of liquid. The siphon however will continue to operate to feed liquid from the compartment 6 into the compartment 7 until substantially the same liquid level is reached in both of these compartments at for example the level B, whereupon the siphon will cease to operate for the reason that it has reached a balanced condition. Inasmuch as the fluid inlet 2 is sealed, it will be apparent that unless further liquid or air is permitted to enter the chamber 1 that no further liquid can exit therefrom. I arrange however to regulate the entrance of air through the air inlet 4 in such manner that by controlling the amount of air which is permitted to enter the chamber I regulate the amount of liquid permitted to leave the chamber. I may control this entrance of air in many ways, but I find a very satisfactory manner is to employ some filtering or porous substance through which air can slowly filter so as to enter the chamber in regulable quantities.

For example I may associate with the inlet 4 a porous clay filter 14, so that any air which enters the chamber will be required to pass through this filter and in order to regulate the amount of air passing through the filter 14, I may mount a rubber sleeve 15 to slide longitudinally on the outside of the filter 14, as clearly shown in the drawings. By sliding this sleeve 15 up or down I can expose a lesser or greater area to the filter and thus regulate the amount of air that can pass through the filter into the chamber. A scale 16 suitably graduated may be mounted on the exterior of the chamber and adjacent the sleeve so that the positions of the sleeve with reference to the filter may be properly gauged and the sleeve readily regulated. In order to preclude dust from lodging on the filter 14, a glass dome 17 may be positioned to enclose the air inlet and associated adjuncts and a loose felt bushing or gasket 18 may serve to hold this glass dome in position but to permit the entrance of air into the dome.

Another form of construction which may be employed is shown in Figure 3, wherein, instead of employing an adjustable rubber sleeve, I have shown a mercury pool 15ª which may be adjusted as to slide by means of a thumb screw 18. By screwing in the screw 18, the mercury level may be caused to raise whereas the unscrewing of the screw will permit the mercury level to lower for the purpose of exposing a lesser or greater area of the filter 14 to the passage of air.

Many other ways may be employed for controlling the passage of air through the air inlet and to so regulate such air as to control the exit of the liquid and the invention is not restricted to the two ways shown which are to be understood as illustrative only. In any event, it will be apparent that by regulating the amount of air which is permitted to enter the casing, accurate control is had for the amount of liquid which is permitted to leave the casing.

Thus if it be assumed that the liquid in both compartments 6 and 7, has reached a substantially balanced level at B, the valve will remain closed while the liquid will flow out of the outlet 3 in accordance with the amount of air permitted to enter the chamber and this flow may be an actual flow or may simply be in the form of a series of drops. However, as the liquid flows out of the compartment 7 through the outlet 3, the level in the two compartments will be maintained substantially constant by the siphon until the level in the compartment 6 recedes to the lower end of the short arm of the siphon or substantially the level C, whereupon the further flow of liquid from the compartment 6 to the compartment 7 through the siphon is precluded and the continued flow of water through the outlet 3 will cause the liquid level in the compartment 7 to fall until it has reached substantially the level D, whereupon the float will drop and open the valve to permit the inflow of further liquid into the compartment 6. This opening of the valve will immediately vent the chamber 1 so that the little remaining liquid in the compartment 7 will flow out through the outlet 3. The flow through the outlet 3 may thereupon cease temporarily until liquid again begins to flow through the siphon 8 whereupon it will again proceed to flow through the outlet 3 until a sufficient level D is built up to again operate the float and close the valve, whereupon the operations described will be repeated.

In practice, the outlet 3 is made of such size that it will deliver less than the minimum amount of liquid which it is desired to feed for a predetermined period, so that even though there is an intermittent flow of liquid through this outlet, it will at no time be possible for the outlet to feed more than is required during the filling operation of the compartment. For example, suppose that it is desired to feed through the outlet eight ounces of liquid a minute. The parts will be so proportioned that during the period that the valve is unsealed possibly five or six ounces of liquid might be fed through the outlet and this might occur during a period of approximately five seconds during which the valve is unseated. The air inlet will be so regulated in such instance that for the remaining fifty-five seconds of that minute, the remaining two or three ounces would be fed through the outlet in the form of consecutive drops, thus making a total of eight ounces for the full minute. It will be understood however that I do not consider it necessary to replenish the compartment at minute intervals as this might be accomplished at much longer intervals particularly if the outflow were to be in small quantities, for example, a few drops a minute. This can be readily accomplished by making the outlet 3 small and by properly proportioning the compartments 6 and 7.

In Figure 2, I have shown a modified apparatus wherein the principle of the two compartment chamber is utilized without however utilizing the entrance of air in regulable quantities. In the construction of Figure 2, the entrance of air is permitted by the fall of a liquid level below a predetermined minimum. That is to say, the liquid level in the reservoir 19 is adapted to automatically control the feed of liquid through the apparatus to said reservoir. In this construction, the outlet 3$^a$ is made somewhat larger than the outlet 3 of the apparatus of Figure 1 and is provided with an enlargement 3$^b$ from which a vent tube 14$^a$ leads to above the liquid level in the chamber 1$^a$. A small passage 20 leads from the interior of the delivery compartment 7$^a$ to the outlet 3$^a$. The chamber 1$^a$ has no other air inlet than the pipe 14$^a$. With this type of construction, it will be apparent that so long as the liquid level in the reservoir 19 is above the lower end of the outlet 3$^a$, the liquid will not flow from the compartment 7$^a$ but as soon as the level in the reservoir 19 drops to the lower end of the outlet 3$^a$, one or more bubbles will be drawn in through the outlet 3$^a$ and the air of said bubbles will pass upwardly through the pipe 14$^a$ and permit the flow of liquid out of the compartment 7$^a$ into the reservoir 19. This operation will continue until the lower end of the outlet 3$^a$ is again sealed against the passage of air.

The advantage of the construction of Figure 2 is that the inlet 2$^a$ may be connected to the street main or other liquid head where the pressure is either constant or variable and by feeding through the two compartments and controlling the feed by the liquid level in the reservoir 19, I am able to control this flow in a thoroughly satisfactory manner.

It will thus appear that while there is a slightly different mode of operation in the two apparatus shown in Figures 1 and 2, in so far as the control of the flow of the liquid is concerned, the employment of the double compartment chamber is common to both constructions. I am aware that this double compartment chamber might be used in other connections, but these two showings are illustrative of its general application.

I wish it understood however that while I consider the double compartment chamber as useful generally, I also consider the control of the flow of liquid through the admission of regulable quantities of air as constituting an important part of this invention. It is further apparent that the invention embodies different features of construction, certain of which may be employed to advantage without necessarily employing all and the invention is therefore not to be understood as restricted to the specific showing of the drawings but is to be construed as broadly novel as is commensurate with the appended claims.

I am also aware that the manner of controlling the flow of liquid as hereinbefore set forth constitutes a novel method which also forms part of this invention.

The present apparatus and method are adapted for various uses and may be employed in many fields. For example, the apparatus is highly useful in laboratory work where it is desired to feed acids or other liquids in predetermined quantities for predetermined time periods and it is equally applicable to different commercial uses. I therefore do not restrict this invention to any specific practical embodiment.

Having thus fully described the invention what I claim as new and desire to secure by Letters Patent is:

1. An apparatus of the character described embodying a container having a liquid inlet, a liquid outlet and an air inlet, means controlled by the liquid level in the container for automatically closing the liquid inlet when the liquid level has reached a predetermined minimum, and means for controlling the entrance of air into the container through the air inlet to thereafter control the flow of liquid through the outlet.

2. An apparatus of the character described embodying a closed container provided with a liquid inlet, a liquid outlet and an air inlet, means for automatically sealing the liquid inlet when the liquid level in the container has reached a predetermined height, a filtering medium associated with the air inlet and through which air is required to pass in order to enter the container, and means for varying the capacity of the filtering medium to control the amount of air permitted to enter the container.

3. An apparatus of the character described embodying a closed container provided with a liquid Inlet, a liquid outlet and an air inlet, means for automatically sealing the liquid inlet when the liquid level in the container has reached a predetermined height, a filtering medium associated with the air inlet and through which air is required to pass in order to enter the container, and means associated with the filtering medium for varying the exposed superficial area thereof.

4. An apparatus of the character described embodying a closed container adapted to contain liquid and provided with an outlet below the liquid level in the container, an air inlet above the liquid level in the container, and a filtering medium associated with the air inlet and through which air is adapted to filter and enter the container for the purpose of permitting liquid to flow through the outlet, and means for varying the capacity of the filtering medium to regulate the amount of air permitted to enter the container.

5. An apparatus of the character described embodying a closed container adapted to contain liquid and provided with an outlet below the liquid level in the container, an air inlet above the liquid level in the container, a filtering medium associated with the air inlet and through which air is adapted to filter and enter the container for the purpose of permitting liquid to flow through the outlet, and means for varying the superficial area of the filtering medium to regulate the amount of air allowed to enter the container.

6. An apparatus of the character described embodying a closed container, the interior of which is divided into receiving and delivery compartments and which container has an inlet for delivering liquid into a receiving compartment, an outlet for delivering liquid from the delivery compartment and an air inlet through which air is introduced into the container, a siphon for transferring liquid from the receiving compartment to the delivery compartment, a float associated with the delivery compartment, a valve operated by the float and controlling the liquid inlet, and means associated with the air inlet for controlling the amount of air permitted to enter the container when the inlet is sealed.

7. An apparatus of the character described embodying a closed container, the interior of which is divided into receiving and delivering compartments and which container has an inlet for delivering liquid into a receiving compartment, an outlet for delivering liquid from the delivery compartment and an air inlet through which air is introduced into the container, a siphon for transferring liquid from the receiving compartment to the delivery compartment, a float associated with the delivery compartment, a valve operated by the float and controlling the liquid inlet, a porous substance associated with the air inlet and through which air is adapted to filter into the cell when the inlet is sealed.

8. An apparatus of the character described embodying a closed container, the interior of which is divided into receiving and delivery compartments and which container has an inlet for delivering liquid into a receiving compartment, an outlet for delivering liquid from the delivery compartment and an air inlet through which air is introduced into the container, a siphon for transferring liquid from the receiving compartment to the delivery compartment, a float associated with the delivery compartment, a valve operated by the float and controlling the liquid inlet, a porous substance associated with the air inlet and through which air is adapted to filter into the cell when the inlet is sealed, means for varying the exposed superficial area of the porous substance to regulate the amount of air permitted to enter the container through such substance.

9. An apparatus of the character described embodying a closed container, the interior of which is divided into receiving and delivery compartments and which container has an inlet for delivering liquid into a receiving compartment, an outlet for delivering liquid from the delivery compartment and an air inlet through which air is introduced into the container, a siphon for transferring liquid from the receiving compartment to the delivery compartment, a float associated with the delivery compartment, a valve operated by the float and controlling the liquid inlet.

10. An apparatus of the character described embodying a closed container divided into receiving and delivery compartments and provided with a liquid inlet to the receiving compartment and a liquid outlet from the delivery compartment, siphon means for siphoning liquid from the receiving compartment into the delivery compartment, and a manually adjustable device for admitting regulable quantities of air into the delivery compartment above the liquid level therein.

11. An apparatus of the character described embodying a closed container divided into receiving and delivery compartments and provided with a liquid inlet to the receiving compartment and a liquid outlet from the delivery compartment, siphon means for siphoning liquid from the receiving compartment into the delivery compartment, and means for admitting air into the container above the liquid level therein.

In testimony whereof I have signed the foregoing specification.

JACK D. SARTAKOFF.